United States Patent [19]
Matsumoto et al.

[11] Patent Number: 6,068,953
[45] Date of Patent: May 30, 2000

[54] COLOR FILTER FOR LIQUID CRYSTAL DISPLAY DEVICE

[75] Inventors: Fuminao Matsumoto, Hino; Akihiko Kanemoto, Yokohama; Tomohiro Inoue, Yamato; Hiroshi Kondo, Yokohama, all of Japan

[73] Assignee: Ricoh Company, Ltd., Tokyo, Japan

[21] Appl. No.: 09/192,326

[22] Filed: Nov. 16, 1998

[30] Foreign Application Priority Data

Nov. 17, 1997 [JP] Japan .................................. 9-332500
Apr. 10, 1998 [JP] Japan ................................. 10-116098

[51] Int. Cl.⁷ ............................ G02B 5/20; G02F 1/1335
[52] U.S. Cl. ................................................ 430/7; 349/106
[58] Field of Search ......................................... 430/7, 321

[56] References Cited

U.S. PATENT DOCUMENTS 5,573,876 11/1996 Suzuki et al. ............................... 430/7
5,770,349 6/1998 Suginoya et al. ......................... 430/321

FOREIGN PATENT DOCUMENTS 1-145626 6/1989 Japan .
1-241522 9/1989 Japan .
3-293634 12/1991 Japan .

OTHER PUBLICATIONS

Patent Abstracts of Japan, JP 6–34809, Feb. 10, 1994.

Tetsuo Saji, et al., J. Am. Chem. Soc., vol. 113, pp. 450–456, "Formation of Organic Thin Films by Electrolysis of Surfactants with the Ferrocenyl Moiety", 1991.

*Primary Examiner*—John A. McPherson
*Attorney, Agent, or Firm*—Oblon, Spivak, McClelland, Maier & Neustadt, P.C.

[57] ABSTRACT

A color filter layer for a color liquid crystal display device is provided, including a plurality of color filters each formed on delineated stripes of transparent electrodes formed substantially parallel to each other on a transparent insulating substrate. These color filters are each electrochemically formed on the delineated stripes of transparent electrodes serf-aligned to the delineated stripes. In addition, a layer of transparent resin material is further provided as a leveling layer that is cured by being exposed to light incident from the backside of the substrate using the color filters as a mask and fills gap portions between the color filters.

13 Claims, 4 Drawing Sheets

COLOR FILTER FOR LIQUID CRYSTAL DISPLAY DEVICE

BACKGROUND OF THE INVENTION

1. Field of the Invention

The present invention relates to a color filter layer for liquid crystal display device and more particularly, to a color filter formed self-aligned to stripes of electrodes of the display device.

2. Discussion of the Background

Liquid crystal flat panel display devices are increasingly used due to their low consumption of electrical power and small size. Liquid crystal display devices are widely used in information displays as well as various consumer products. Recently, the performance of large liquid crystal display devices has approached that of the cathode ray tubes.

Liquid crystal display devices typically include at least a layer of liquid crystals placed between a pair of light transparent substrates provided with alignment films and transparent electrodes, a pair of polarizers disposed on outward surfaces of the substrates.

Although a sheet of glass plate has been mostly used as the transparent substrate, a film of plastic material is increasingly used as substrates in liquid crystal displays for handheld devices, such as cellular phones and portable pocket books, for example. Typically, the plastic films used as substrates are relatively thin, having a thickness of from 0.1 to 0.3 mm and of light weight.

This trend is expanded, as the demand increases for color display of data, including images in hand-held displays, which are typically exemplified by reflection type liquid crystal displays with a low power consumption.

One disadvantage arising from the use of plastic materials as such substrates is the difficulty in forming color filters through precise patterning process steps due to a relatively large change in the dimension of plastic materiels with environmental conditions, such as temperature and humidity. This results in the extensive use of monochrome displays.

Several methods have been proposed for displaying color images by liquid crystal displays without color filters. However, since these methods have limited capabilities, such as the number of color tones and vividness of displayed colors, color filters are primarily used for color displays at present. These methods are especially demanding for liquid display devices having plastic substrates, and have not been carried out successfully, since these methods require a strict control of cell spacing, for example, which is rather difficult to attain for the plastic materials.

Various methods of color filter fabrication are disclosed which include dyeing, dispersing pigments, electrodepositing, electrolyzing (or disrupting) micelles, printing and other similar methods. In the dyeing, dispersing and printing methods, either red (R), green (G) or blue (B) finer is formed on a transparent substrate.

These R, G and B filters are formed such that each is distributed substantially uniform, which requires a strict positional control during the fabrication. In addition, these color filter patterns are required to be positioned so as to be connected further to the electrodes of peripheral driving circuitry.

The precision feasible for the pattern registration is generally determined by the kind of, and the size of the substrate, for example, and the process equipment used for the fabrication. For glass substrates, a precision on the order of one micron can typically be maintained.

For plastic substrates, however, changes in dimension with temperature and humidity are generally larger than those of glass substrates. Depending upon environmental conditions as well as heat history of plastic materials, the changes sometimes amount to 0.1%, which results in difficulties in attaining precise registration, as noted above.

To form color fillers on plastics substrates with a sufficient precision for fabricating liquid crystal device with satisfactory device characteristics, it desirable to use fabrication processes which do not require precise positional registration or to reduce such stringent processes as much as possible.

In the above-mentioned methods of color filter fabrication, such as electrode position and micelle electrolysis, color filters are formed through electrochemical processes on a pattern of transparent electrodes which are previously prepared on the substrate, and a dislocation (or misregistration) can therefore be minimized with respect to each other among color filters, as will be described hereinbelow.

In addition, layers of the color filters may also be rendered conductive through these methods, by containing, or being admixed with conducting materials. As disclosed in Japanese Laid-Open Patent Publication No. 6-34809, the thus formed conductive color filter layers may serve as the electrodes not only for the electrochemical processes but also for driving liquid crystal devices.

For transmission type liquid crystal displays, a pattern of the black filters or a black matrix (BM) is commonly formed so as to fill gap portions between the RGB filters to thereby be able to enhance the contrast and color purify of the display. However, it is noted that the black matrix is not used in reflection type displays, since the reflection type displays are typically formed to sufficiently reflect incident light back to an observer and to provide a display as clear as possible.

It is also noted that the black matrix not only blocks light which bleeds through color filters, but also assists to level the surface of the display which is defined by the face of color filters which are disposed facing to a liquid crystal layer. Although the required surface flatness is dependent on the type of liquid crystal displays, it is typically on the order of 0.1 micron for super twisted nematic (STN) type displays.

As mentioned above, the color filters may be formed through electrochemical processes to be conductive and serve as the electrodes not only for the electrochemical processes but also for driving display devices. Further, as noted above, the surface flatness is considerably important for the STN type displays. Therefore, it is not desirable to form a thick leveling layer on top of respective color filters especially in the case of STN displays, because of a potential drop induced in the liquid crystal layer by the thick layer. That is, it is desirable to form the leveling layers only in gap portions between color filters, and either a thin or no leveling layer is formed on top of the color filters.

To make this possible, as long as the device is fabricated on a glass substrate, patterning process steps can be employed, including conventional photolithography techniques for the leveling layer composed of photo-curing acrylic resin. However, these steps are difficult to apply to a display device with a plastic film substrate because of the difficulties mentioned in precise positioning for the plastic material.

SUMMARY OF THE INVENTION

It is therefore an object of the present invention to provide a color filter layer and a fabrication method, which overcome the above-noted difficulties.

The above objects and others are provided by a color filter layer for a color liquid crystal display device, including a plurality of color filters each provided on delineated stripes of transparent electrodes formed substantially parallel to each other on a transparent insulating substrate. These color filters are each electrochemically formed on the delineated stripes of transparent electrodes self-aligned to the delineated stripes. In addition, a layer of transparent resin material is further provided to serve as a leveling layer that is cured by being exposed to light incident from the backside of the transparent substrate using the color filters as a mask and fills gap portions between the color filters.

DETAILED DESCRIPTION OF THE PREFERRED EMBODIMENTS

In one embodiment of the present invention, a conductive layer that is transparent to visible light and absorbent to ultraviolet light is provided contiguously either above or below the color filers to carry out an appropriate formation of the color filters and leveling layer. Alternatively, a layer that is transparent to visible light and absorbent to ultraviolet light, and that is either insulating or conductive, is provided being patterned in the same delineated stripes as, and contiguously below, the delineated stripes of transparent electrodes In another embodiment, the present invention provide a method of fabricating a color filter layer for a color liquid crystal display device, including forming a plurality of delineated stripes of transparent electrodes substantially parallel to each other on a transparent insulating substrate;

electrochemically forming thereon a plurality of color filters each on the delineated stripes of transparent electrodes self-aligned to the delineated stripes;

forming thereon a conductive layer that is transparent to visible light and absorbent to ultraviolet light;

providing a layer of transparent resin material on the entire surface of thus prepared structure; and curing the layer of transparent resin materially exposing to light incident from the backside of the transparent substrate using the color filters as a mask, thereby a leveling layer is formed filling gap portions between the color filters.

In still another embodiment, the present invention provide a method of fabricating a color filter layer for a color liquid crystal display device, including the steps of forming on a transparent insulating substrate a first layer that is transparent to visible light and absorbent to ultraviolet light, and that is either insulating or conductive;

forming thereon a second layer of transparent conductive layer;

forming a plurality of delineated stripes of an accumulated layer composed of the first and second layers substantially parallel to each other;

electrochemically forming thereon a plurality of color filters each on the delineated stripes self-aligned to the delineated stripes;

providing a layer of transparent resin material on the entire surface of thus prepared structure; and curing the layer of transparent resin materially exposing to light incident from the backside of the transparent substrate using the color filters as a mask, thereby a leveling layer is formed filling gap portions between the color filters.

By using such a construction in the present invention, the color filters are suitably arranged in a predetermined manner and the leveling layer is formed for a potential voltage to appropriately be applied to the display device, whereby a high contrast, satisfactory color purity, and other display characteristics for the liquid crystal device can be achieved.

Moreover, the present invention is not limited to the specific embodiments described herein. For example, it is appreciated that the construction and the fabrication methods of the color filters described herein are adaptable to any form of optical devices, such as optical sensors and other similar devices as well. Other embodiments will be apparent to those skilled in the art upon reading the following description with reference to the drawings.

Figure 1:
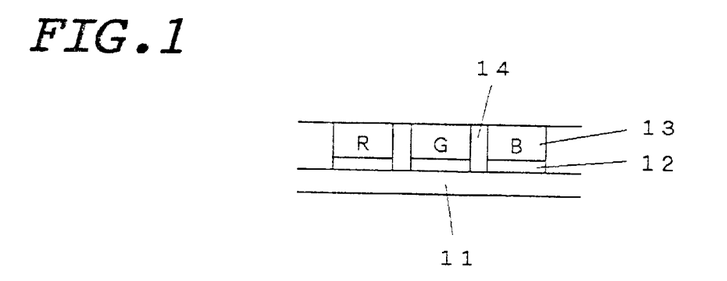
FIG. 1 is a cross-sectional view illustrating a color filter layer according to one embodiment disclosed herein, including a plurality of color filters provided on delineated stripes of transparent electrodes which are formed on a transparent insulating substrate, and a layer of transparent resin material further provided as a leveling layer filling gap portions between the color filters.

FIG. 1 illustrates an embodiment of color filters disclosed herein. In this embodiment, the color filters 13 are each formed on a transparent insulating substrate 11 having an underlying transparent electrodes 12 therebetween, and a layer of transparent resin material 14 is further provided as a leveling layer between the color filters.

More particularly, a transparent conductive film is selected as a starting material, which is composed of a transparent insulating substrate 11 disposed thereon with a conductive layer 12. A photoresist layer (not shown) is then disposed on the entire surface of the conductive film and predetermined portions of the photoresist layer is then removed through conventional photolithography processes to thereby form a photoresist pattern.

Using the photoresist pattern as a mask, predetermined portions of the conductive layer 12 are removed through conventional photolithography processes, such as masking and etching operations, to thereby form a plurality of delineated stripes of transparent electrodes 12.

Subsequently, a conductive color filter layer 13 is electrochemically formed on each transparent electrode in a self-aligned manner using the delineated transparent electrodes 12 as a mask, whereby a plurality of color filters 13 are formed having the same pattern as the transparent electrodes.

After a layer of photo-curing transparent resin 14 is provided on the entire surface of the structure, the resin is cured by exposing to light incident from the backside of the transparent substrate 11 using the color filter layers as a mask, whereby a leveling layer 14 is formed filling the gap portions between color filters.

The transparent resin suitably used in the present invention includes photo-curing resins such as acrylic, epoxy, polyurethane and polyamide resins.

A plurality of color filters 13 are each electrochemically formed on a portion of the delineated stripes of transparent electrodes 12 in a self-aligned manner, as will be described hereinbelow. The position at which the color filter is formed is therefore uniquely determined. In addition, the leveling layer 14 is formed by being exposed to light incident from the backside of the transparent substrate 11 using the color filter layers 13 as a mask. Therefore, a minimal amount of displacement, if any, may be caused in positioning these layers even in the case where the dimension of the substrate changes during fabrication processes. As a result, it is feasible to form color filters on a plastic substrate as well as a glass substrate with a precision sufficient for positioning a plurality of layers of liquid crystal display device.

To provide brighter display images with reflection mode of display devices, color filters are formed with a reduced thickness (i.e., increased light transmission) from that of transmission type of displays. Since color filters with such a reduced thickness are not be able to completely block ultraviolet light, residual portions of photo-curing resin are formed on top of the color filters.

This difficulty may be obviated by further providing a layer of ultraviolet light absorbent materials having the same pattern as the color filters.

These light absorbent materials may be selected among the materials which are transparent to visible light ranging from about 400 nm to 800 nm and which are less transparent (or more absorbent) to ultraviolet light of below about 400 nm. Examples of such ultraviolet light absorbent materials include pigments, metal oxide layers, metal oxide particles or other similar materiels.

Figure 2:
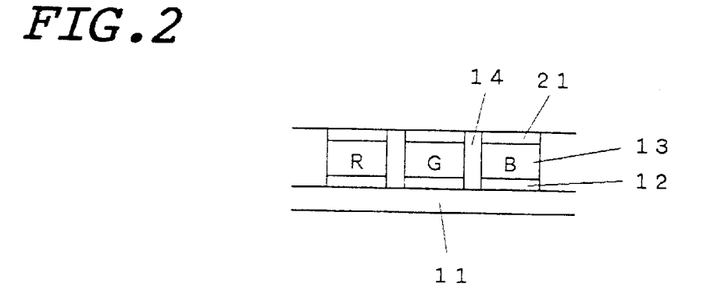
FIG. 2 is a cross-sectional view illustrating a color filter layer according to another embodiment disclosed herein, wherein a conductive layer that is transparent to visible light and absorbent to ultraviolet light is further provided contiguously above each of the color filers.
Figure 3:
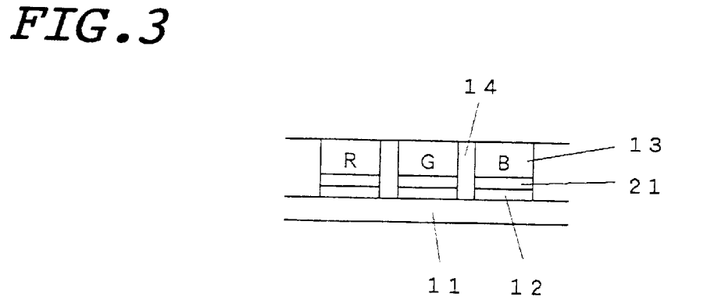
FIG. 3 is a cross-sectional view illustrating a color filter layer according to still another embodiment disclosed herein, wherein a conductive layer that is transparent to visible light and absorbent to ultraviolet light is further provided contiguously below each of the color filers.

The ultraviolet absorbent layer 21 is provided either above, or under the conductive color filter layer 13 as illustrated in FIGS. 2 and 3, respectively. Although the layer has to be conductive in both these cases, there is another construction (FIG. 4) in which an ultraviolet absorbent layer 21 is provided between a transparent insulating substrate 11 and the transparent electrode 12, and which the layer may be either insulating or conductive, since the presently formed layer is overlaid by the transparent electrode 12.

In still another aspect of the invention, color filters may be formed using an intermediate layer which is absorbent to not only ultraviolet light but visible light as well, which follows.

Figure 5A:
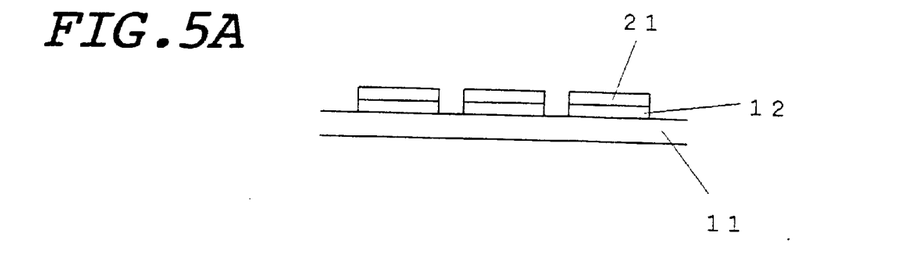
FIGS. 5A through 5E illustrate, in a series of cross-sectional views, a sequence of important process steps utilized in fabricating a color film layer according another embodiment disclosed herein.

Firstly, a light absorbent layer 21 is provided on transparent electrode layer 12 and both layers are patterned through photolithographic process steps to have the same pattern (FIG. 5A). Secondly, on the entire surface of the film structure, a layer 14 of photo-curing acrylic resin is disposed, and then exposed to light incident from the backside of the transparent substrate 11 (FIG. 5B) to form a transparent leveling layer 14. Subsequently, the light absorbent layer 21 is removed through an appropriate method such as, for example, wet etching method (FIG. 5D). Plastic color fillers consisting of red, green and blue conductive color filters are then formed through electrochemical methods only on top of the transparent electrodes 12 (FIG. 5E).

Since the light absorbent layer 21 is removed prior to the formation of color filters 13, the material for that layer may be visible light absorbent such as metal layers.

EXAMPLES

Example 1

Referring to FIG. 1, a color filter layer for a liquid crystal display device was fabricated as follows.

A conductive transparent film was selected as a starting material, which was composed of a transparent insulating substrate 11 of polyether sulfone disposed thereon with at least a conductive layer 12 of indium tin oxide (ITO) end commercially available as FST-5340 from Sumitomo Bakelite Co.

A photoresist layer (not shown) was disposed on the entire surface of the FST-5340 transparent film and predetermined portions of the photoresist layer was removed through conventional photolithography processes to thereby form a photoresist pattern.

Using the photoresist pattern as a mask, predetermined portions of the conductive layer 12 on the transparent film were removed from the substrate 11 through conventional photolithography processes such as masking and etching operations to thereby form 960 delineated stripes from transparent electrodes 12 to a width of 90 microns and a pitch of 110 microns, as illustrated in FIG. 1.

The thus prepared film was immersed into a micelle solution composed of hydrophobic red pigments, conductive particles, surfactants and supporting electrolytes. By applying a potential voltage to every third electrode stripe in the micelle solution, a red color filter layer R was formed on the currently selected electrode stripes to a thickness of approximately 1.5 micron. Subsequently, the entire film was thoroughly rinsed with distilled water and dried at 120° C.

This was followed by the formation of green color filters, which was carried out in a similar manner as above, with the exception that hydrophobic pigments were green colored. Likewise, blue conductive layers were subsequently formed with blue hydrophobic pigments, whereby a plastic color filter layer for a liquid crystal device was formed, consisting of red, green and blue conductive color filter layers.

Transmittance of the color filters at 365 nm were subsequently measured. The results from the measurements indicated that a maximum transmittance of about 5% was obtained at red filter portions.

On the entire surface of the film structure, a layer of photo-curing acrylic resin was spin-coated to a thickness of about 2 microns. Following to pre-baking, the film was exposed to light ($300\ mJ/cm^2$) from a high-pressure mercury arc lamp incident from the backside of the transparent substrate 11, then developed with an alkaline solution (i.e., approximately 1% aqueous solution of sodium hydrogen carbonate).

A leveling layer 14 was thus formed to a thickness of approximately 1.6 micron in 20 microns gap portions between color filters. Although there was no layer on top of either the green or blue filters, a layer of residual acrylic resin was found on the red filters to a thickness of about 0.1 micron. In this context, it may be noted that layer portions remaining on color filters with a thickness of up to about 0.3 micron are known not to appreciably affect to display characteristics.

In addition, when the surface flatness was measured for the film following a post bake at 150° C., a roughness value of about 0.2 micron at most was found among color filters.

Example 2

Plastic color filters consisting of red, green and blue conductive color filter layers were fabricated on an FST-5340 transparent film in a similar manner to Example 1, with the exception that the color filters were each formed to a thickness of 0.5 micron in place of the 1.5 micron thickness of Example 1.

Figure 7:
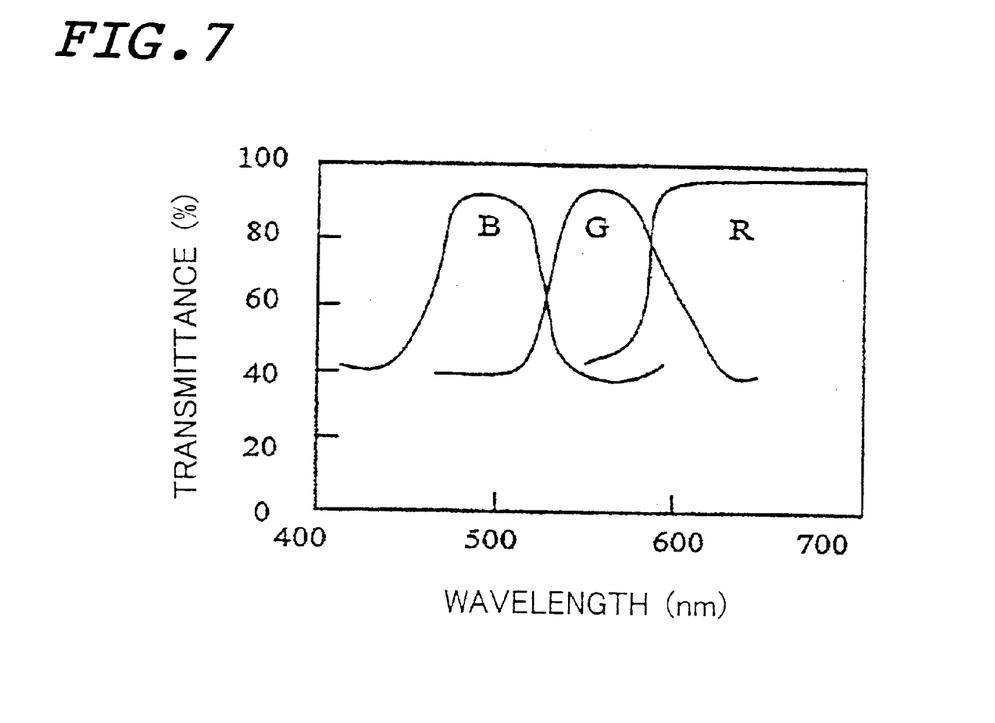
FIG. 7 is a graph of color filter transmittance as function of wavelength for the red, green or blue filter disclosed herein.

When transmission spectra were measured for each filter of the respective color, the spectra were obtained as shown in FIG. 7. The results indicate that, with increasing transmittance values for respective color filter, an increase gives rise to in the wavelength region of 400 nm or less. Since the photo-induced polymerization of the present photo-curing resins is sensitized by light in this region, the above-noted increase in transmittance tends to decrease the contrast between two portions, one covered, and the other not covered by the color filters.

To obviate this decrease in the contrast, a thin layer of ultraviolet light absorbent materials was formed on top of the color filters as follows (FIG. 2). The substrate film with color filters thereon was immersed into a micelle solution composed of hydrophobic red pigments, conductive particles, titanium oxide particles, indium tin oxide (ITO) particles, surfactants and supporting electrolytes. By applying a voltage to every electrode stripe in the micelle solution, an ultraviolet light absorbent layer 21 was formed to a thickness of 0.5 micron. Subsequently, the entire film was thoroughly rinsed with distilled water and dried at 120° C.

Transmittance of the color filters were subsequently measured and found to be about 3% at 365 nm.

On the entire surface of thus prepared structure, a layer of photo-curing acrylic resin was spin-coated to a thickness of about 1.2 micron. Following to pre-baking, the film was exposed to light (500 mJ/cm$^2$) incident from the backside of the transparent substrate 11, then developed with an alkaline solution (i.e., approximately 1% aqueous solution of sodium hydrogen carbonate), whereby a transparent leveling layer 14 was successfully formed.

Although the ultraviolet absorbent layer 21 was formed on top of the color filters 13 in the present example, the ultraviolet absorbent layer 21 may also be formed under the color filters 13 and on top of the transparent electrodes 12 as illustrated in FIG. 3, to form a leveling layer with a satisfactory surface flatness.

Example 3

Figure 4:
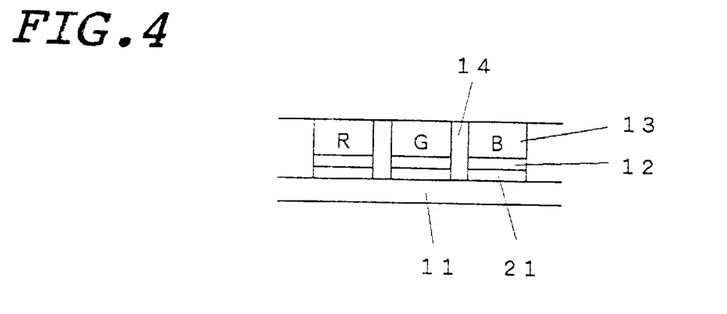
FIG. 4 is a cross-sectional view illustrating a color filter layer according to yet another embodiment disclosed herein, wherein a layer that is transparent to visible light and absorbent to ultraviolet light, and that is either insulating or conductive, is provided contiguously below the delineated stripes of transparent electrodes.

The conductive transparent film FST-5340 was used as a starting material for a color filter layer. After removing a conductive layer from a transparent substrate 11 through etching with 1 N hydrochloric acid, layers of zinc oxide 21 and of ITO 12 were successively disposed on the substrate 11 through the sputtering method to a thickness of 0.2 micron and 0.1 micron, respectively.

On the prepared structure, a predetermined pattern of a photoresist layer (not shown) was formed in a similar manner to Example 1. Using the photoresist pattern as a mask, predetermined portions of the zinc oxide 21 and ITO 12 layers were removed through etching with 0.1 N hydrochloric acid aqueous solution, thereby forming 960 delineated stripes composed of zinc oxide 21 and ITO 12 with a width of 90 microns and a pitch of 110 microns. The photoresist pattern was then removed upon completing the etching step.

Subsequently, plastic color filters 13 consisting of red, green and blue conductive color filter layers were formed in a similar manner to Example 2 to a thickness of 0.5 micron, as illustrated in FIG. 4.

On the entire surface of the film structure, a layer of photo-curing acrylic resin was spin-coated to a thickness of about 1.0 micron. Following to pre-baking, the film was exposed to light (500 mJ/cm$^2$) incident from the backside of the transparent substrate 11, then developed with an alkaline solution (i.e., approximately 1% aqueous solution of sodium hydrogen carbonate), whereby a transparent leveling layer was formed.

Example 4

Referring to FIGS. 5A through 5E, a color filter layer for a liquid crystal display device was fabricated as follows.

Using a conductive transparent film of FST-5340, predetermined portions of a conductive layer 12 were removed in similar manner to Example 1 through conventional photolithography processes such as masking and etching operations, to thereby form 960 delineated stripes of transparent electrodes 12 to a width of 90 microns and a pitch of 110 microns.

The thus prepared film with electrode stripes thereon was immersed into a micelle solution composed of zinc oxide particles, surfactants and supporting electrolytes. By applying a voltage to every electrode stripe in the micelle solution, an ultraviolet light absorbent layer 21 was formed to a thickness of 1.0 micron (FIG. 5A). Subsequently, the entire film was thoroughly rinsed with distilled wafer and cried at 120° C. It is noted that, since the top portion of the resultant film was composed of zinc oxide layers 21 overlying the electrode stripe 12, each of thus formed stripes was non-conductive.

Figure 5B:
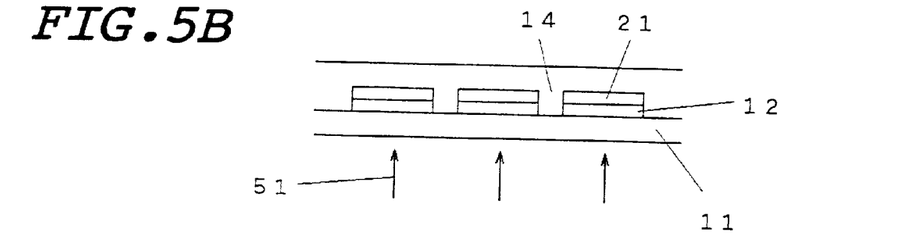

Referring to FIG. 5B, on the entire surface of the film structure, a layer of photo-curing acrylic resin was spin-coated to a thickness of about 0.6 micron. Following to pre-baking, the film was exposed to light 51 (500 mJ/cm$^2$) incident from the backside of the transparent substrate 11, then developed with an alkaline solution (i.e. approximately 1% aqueous solution of sodium hydrogen carbonate), whereby a transparent leveling layer 14 was formed.

Subsequent to the hardening of the resin through a post bake at 150° C., zinc oxide particles on the electrode stripes were removed through ultrasonic cleaning (FIG. 5D). Plastic color filters consisting of red, green and blue conductive color filter layers were then formed to a thickness of 0.5 micron in a similar manner to Example 2 (FIG. 5E). On the entire surface of the film structure, a layer of thermosetting acrylic resin was subsequently formed as a protective coating (not shown) to a thickness of 0.2 micron.

Example 5

Referring to FIGS. 5A through 5E and 6, another color filter layer for a liquid crystal display device was fabricated as follows.

Figure 6:
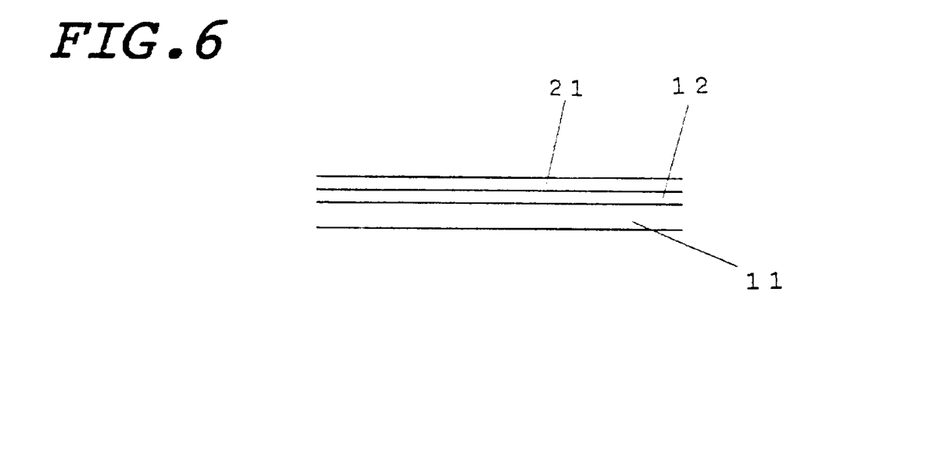
FIG. 6 illustrates a layer chromium disposed on a transparent conductive film.

On the entire surface of a transparent film of FST-5340, a layer of chromium 21 was disposed by vacuum evaporation method to a thickness of 0.2 micron (FIG. 6). On this prepared layer, a predetermined pattern of a photoresist layer was formed in a similar manner to Example 1. Using the photoresist pattern as a mask, predetermined portions of the chromium layer 21 and transparent electrode 12 layers were removed through a wet etching process, to thereby form 960 delineated stripes composed of chromium 21 and transparent electrode 12 with a width of 90 microns and a pitch of 110 microns (FIG. 5A). The photoresist pattern was then removed upon completing the etching step.

Figure 5C:
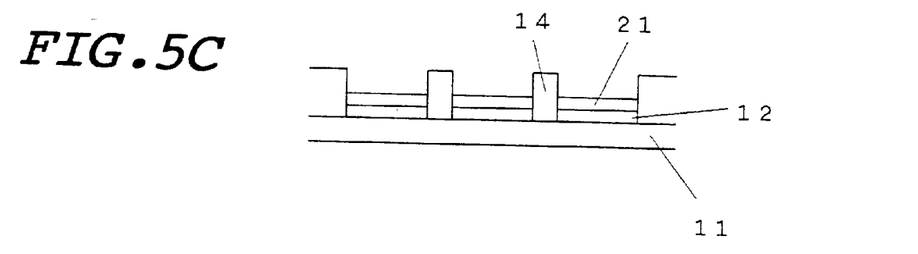
Figure 5D:
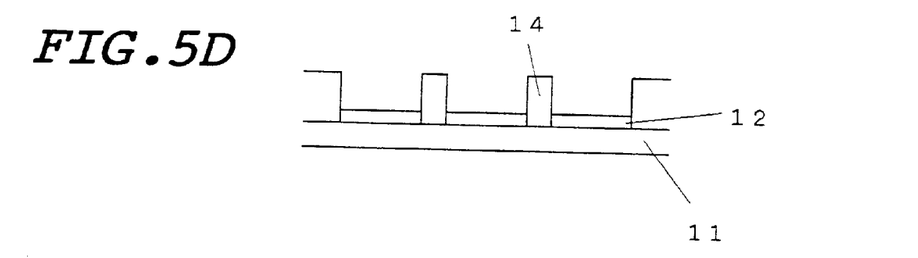
Figure 5E:
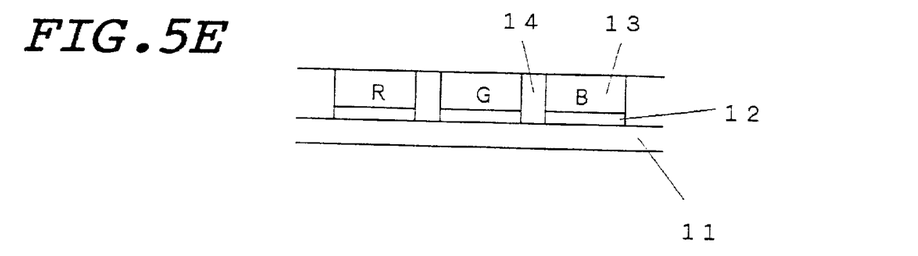

In a similar manner to Example 4, on the entire surface of the film structure, a layer of photo-curing acrylic resin was then spin-coated. Following to pre-baking, the film was exposed to light 51 (500 mJ/cm$^2$) incident from the backside of the transparent substrate 11 (FIG. 5B), then developed with an alkaline solution (i.e., approximately 1% aqueous solution of sodium hydrogen carbonate), whereby a transparent leveling layer was formed to a thickness of about 0.6 micron (FIG. 5C). Subsequent to the hardening of the resin through a post bake at 150° C., chromium particles on the electrode stripes were removed through a wet etching method (FIG. 5D).

Plastic color filters consisting of red, green and blue conductive color filter layers were then formed to a thickness of 0.5 micron in a similar manner to Example 4 (FIG. 5E). Similarly, a layer of thermosetting acrylic resin (not shown) was also formed as a protective coating to a thickness of 0.2 micron.

Comparative Example 1

Plastic color filters consisting of red, green and blue conductive color filter layers were formed on a conductive transparent film FST-5340 in a similar manner to Example 1, with the exception that these color filter layers were each formed to a thickness of approximately 0.5 micron and that a layer of photo-curing acrylic resin was formed as a leveling layer IO a thickness of about 0 7 micron.

Although a reduced thickness of color filters presently formed results in brighter display images in reflection type liquid crystal device, it has disadvantages as follows. With increasing transmittance values for respective color filter, an increase gives rise to in the wavelength region of 400 nm or less, the contrast tends to decrease between two portions, one covered, and the other not covered by the color filters, as indicated earlier in Example 2. As a result, a leveling layer in the present example was not formed in such a manner as to fill only gap portions between color filters without any residual portions on top of the color filters.

The relationship between the amount of light exposure and resulting surface flatness was investigated, and the results are shown in Table 1.

TABLE 1

| Amount of light exposure (mJ/cm$^2$) | 50 | 100 | 300 | 500 |
|---|---|---|---|---|
| Surface flatness (micron) | 0.7 | 0.6 | 0.5 | 0.5 |
| Thickness of red filter (micron) | 0 | 0.3 | 0.7 | 0.7 |

As mentioned above in the previous embodiments, a leveling layer 14 is formed filling the gap portions between color filters with transparent photo-curing resin, which is advantageous for attaining brighter display images in the reflection type liquid crystal display devices. In addition, its fabrication method is characterized by disposing a layer of the resin on the entire surface of the structure and subsequently curing by exposing to light incident from the backside of the transparent substrate 11 using the color filter layers as a mask. It is noted, that the above-noted fabrication method of the present invention may also applicable to the formation of black filters or a black matrix, which is necessary to enhance the contrast and color purity of transmission type liquid crystal displays.

In the case of such black matrix formation, a black photo-curing resin material can be used such as, for example, Color Mosaic CK-200 from Fuji-Hunt Electronics Technology Co., and the resin is subjected to the similar process steps to those aforementioned embodiments such as teeing disposed on the entire surface of the structure to be exposed to light incident from the backside of the substrate and then developed with an alkaline solution, whereby black stripes were formed filling the gap portions between color filters.

Example 6

Figure 8:
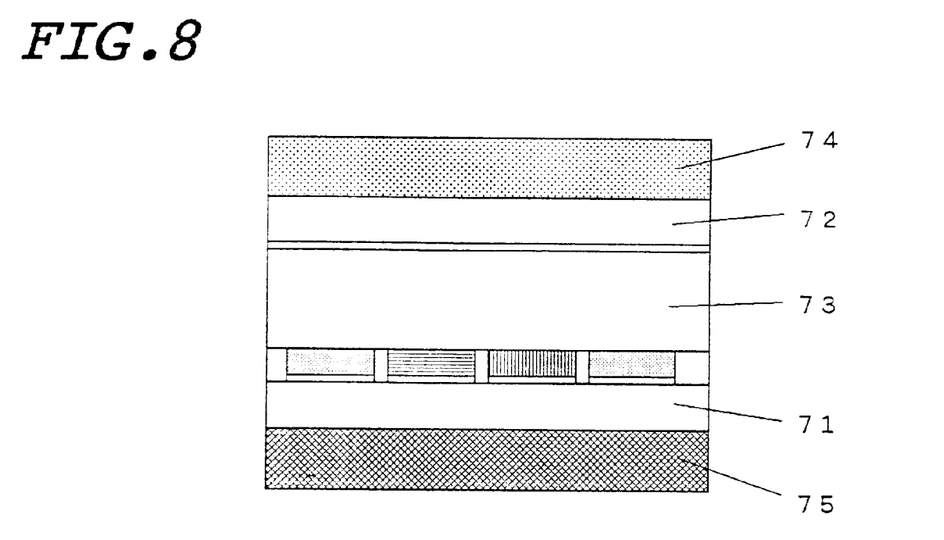
FIG. 8 is a cross-sectional view illustrating a liquid crystal display device according to another embodiment disclosed herein.

Referring to FIG. 8, a plurality of reflection type liquid crystal display device were fabricated using color filter layers prepared in the above examples.

The transparent substrate with conductive color filters formed thereon in the Examples 2 through 5 were respectively used as a first transparent substrate for the display device.

One of the transparent substrates 71 was coated with polyamide (AL3046 from Japan Synthetic Rubber Co) to a thickness of 0.1 micron and subsequently alignment treated by rubbing in prearranged directions to be used as a first substrate. A second substrate 72 was separately prepared to have 240 delineated stripes of transparent electrodes disposed thereon.

The first and second substrates were subsequently arranged apart from, and opposed to each other to thereby fabricate a liquid crystal display device with a twist angle of 240° and a cell spacing of 7 microns.

The assembly was then filled with an STN type liquid crystal material 23 and subsequently sealed, whereby a liquid crystal display device was fabricated The display device was then connected to driving circuitry and further provided with a polarizer 74 on one outer face of the device, also with a phase difference plate 74 thereon and a reflective polarizer 75 on the other face.

The thus fabricated display device was then operated and found to be capable of exhibiting satisfactory color display characteristics such as high contrast and color purity, among others.

This application is based on Japanese Patent Applications Nos. 9-332500 and 10-116098, filed with the Japanese Patent Office on Nov. 17, 1997 and Apr. 10, 1998, respectively, the entire contents of which are hereby incorporated by reference.

Additional modifications to and variations of the embodiments described above may be made without departing from the spirit and the scope of the present invention. This will be readily apparent to one of ordinary skill in the art.

What is claimed and desired to be secured by Letters Patent of the United States is:

1. A color filter layer for a color liquid crystal display device, comprising a plurality of color filters each provided on delineated stripes of transparent electrodes formed substantially parallel to each other on a transparent insulating substrate, said plurality of color filters each electrochemically formed on said delineated stripes of transparent electrodes self-aligned to said delineated stripes, and a layer of transparent resin material is further provided, which is cured by being exposed to light incident from the backside of said substrate using said color filters as a mask and fills gap portions between said color filters.

2. The color filter layer of claim 1, wherein a conductive layer that is transparent to visible light and absorbent to ultraviolet light is further provided contiguously either above or below said color filers.

3. The color filter of claim 2, wherein said conductive layer is made of indium tin oxide.

4. The color filter layer of claim 1, wherein a layer that is transparent to visible light and absorbent to ultraviolet light, and that is either insulating or conductive, is further provided being patterned in the same delineated stripes as, and contiguously below, said delineated stripes of transparent electrodes.

5. The color filter of claim 1, wherein said transparent insulating substrate is made of polyethersulfone.

6. A color liquid crystal display device, comprising first and second transparent insulating substrates, a layer of liquid crystal material placed between said first and second transparent insulating substrates that are provided thereon with a plurality of delineated stripes of transparent electrodes formed substantially parallel to each other and further thereon with alignment films, wherein a plurality of color filters each electrochemically formed on said delineated stripes of transparent electrodes self-aligned to said delineated stripes of transparent electrodes and a layer of transparent resin material is further provided, which is cured by being exposed to light incident from the backside of said substrate using said color filters as a mask and fills gap portions between said color filters.

7. The color liquid crystal display device of claim 6, wherein a conductive layer that is transparent to visible light and absorbent to ultraviolet light is further provided contiguously either above or below said color filers.

8. The color liquid crystal display of claim 7, wherein said conductive layer is made of indium tin oxide.

9. The color liquid crystal display device of claim 6, wherein a layer that is transparent to visible light and absorbent to ultraviolet light, and that is either insulating or conductive, is further provided being patterned in the same delineated stripes as, and contiguously below, said delineated stripes of transparent electrodes.

10. The color liquid crystal display of claim 6, wherein said first and second transparent insulting substrates are made of polyethersulfone.

11. A method of forming a color filter layer for a color liquid crystal display device, comprising a) forming a plurality of delineated stripes of transparent electrodes substantially parallel to each other on a transparent insulating substrate;

b) electrochemically forming thereon a plurality of color filters each on said delineated stripes of transparent electrodes self-aligned to said delineated stripes;

c) forming thereon a conductive layer that is transparent to visible light and absorbent to ultraviolet light;

d) providing a layer of transparent resin material on the entire surface of the thus prepared structure; and e) curing said layer of transparent resin material by exposing to light incident from the backside of said substrate using said color filters as a mask, thereby forming a leveling layer filling gap portions between said color filters.

12. A method of forming a color filter layer for a color liquid crystal display device, comprising the steps of:

a) forming a transparent conductive layer on a transparent insulating substrate;

b) forming thereon a conductive layer that is transparent to visible light and absorbent to ultraviolet light;

c) forming a plurality of delineated stripes of said transparent conductive layer and conductive layer substantially parallel to each other on a transparent insulating substrate;

d) electrochemically forming thereon a plurality of color filters each on said delineated stripes self-aligned to said delineated stripes;

e) providing a layer of transparent resin material on the entire surface of the thus prepared structure; and f) curing said layer of transparent resin material by exposing to light incident from the backside of said substrate using said color filters as a mask, thereby forming a leveling layer filling gap portions between said color filters.

13. A method of forming a color filter layer for a color liquid crystal display device, comprising:

a) forming a first layer that is transparent to visible light and absorbent to ultraviolet light, and that is either insulating or conductive on a transparent insulating substrate;

b) forming thereon a second layer of transparent conductive layer;

c) forming a plurality of delineated stripes of an accumulated layer composed of said first and second layers substantially parallel to each other;

d) electrochemically forming thereon a plurality of color filters each on said delineated stripes self-aligned to said delineated stripes;

e) providing a layer of transparent resin material on the entire surface of the thus prepared structure; and f) curing said layer of transparent resin material by exposing to light incident from the backside of said substrate using said color filters as a mask, thereby forming a leveling layer filling gap portions between said color filters.

* * * * *